United States Patent Office 2,704,873
Patented Mar. 29, 1955

2,704,873

REMOTELY CONTROLLED PIPE LINING APPARATUS

Kenneth K. Kirwan, Ridgewood, and Alfred G. Perkins, Maywood, N. J., assignors to Centriline Corporation, New York, N. Y., a corporation of Delaware Application July 26, 1951, Serial No. 238,614

22 Claims. (Cl. 25—38)

This invention relates to apparatus for applying lining material such as cement mortar or the like to the interior wall surfaces of pipelines.

The features of the invention are particularly adapted among other possible uses, to be embodied in, or used with, lining machines of the type adapted to travel along within a pipe and having rotatable dispensing means for concurrently distributing the lining material onto the pipe walls. Machines of this general class are disclosed in various patents to Albert G. Perkins, for example U. S. Patent No. 2,262,647, granted November 11, 1941, but the present invention is more especially adapted for use in cases where the pipe is of such small diameter, for example 16" more or less, that an operator cannot enter and accompany the machine to control its operation, with the consequence that various novel remote control means extending to the exterior of the pipe must be provided.

This involves a combination of problems, some of which have not heretofore been satisfactorily overcome. In order for the equipment to be efficient, it is necessary to be able to run the same quickly to the desired location in the pipe for starting the lining operations, and in both starting and stopping the actual lining operations it is necessary to insure that the various elemens of the equipment are started and stopped in the proper order to avoid injury thereto and to insure that the lining material will be distributed uniformly over the interior pipe surfaces. It will be apparent that if the mortar should be irregularly scattered or improperly distributed or applied, then upon hardening of same, the pipeline might be blocked or in unsuitable condition for use, thus possibly requiring expensive lengths of the piping to be dug up and replaced at great cost. Also, if through faulty control of the equipment it should become clogged, jammed or otherwise made inoperative, while containing or surrounded by hardening cement at a position in the pipe remote from an accessible end, it would be an expensive task to recover and recondition the apparatus as well as to replace the resulting ruined lengths of pipe.

With the present invention all these difficulties have been satisfactorily overcome by remotely controllable equipment which has proven to be highly reliable, efficient and economical in practical use and which may be operated by workmen who are not highly skilled, and without extensive training. According to a preferred form of the invention a novel motor driven tractor for advancing the lining machine along in the pipe is provided, having remote control means permitting an attendant outside the pipe to cause the tractor to travel in either direction, preferably either at a relatively slow speed during the actual lining operation, or at a higher speed to permit the machine to be quickly moved to or from the positions where lining is to start or stop. A hose adapted to carry the mortar or other lining material pumped therein, is connected to the machine and runs along the pipe to the exterior thereof to the pumping equipment. Preferably means are provided for automatically withdrawing such hose along with electrical control cables at the same rate of speed as the machine advances during the lining operation, and other automatic means are provided to control the pumping equipment so as to maintain a proper amount of the material in the lining machine during its operation and prevent the forcing of excess material into or through the machine. The lining machine preferably is of the type having a motor-driven rotatable dispensing head for distributing the mortar, accompanied by rotatable trowelling means, and remote controls extending to the exterior of the pipe are provided for these elements, including means for moving the trowels to or from active trowelling positions. Preferably the trowel motor control circuits are so interconnected with the distributor head motor control circuit that when the distributor head is not operating, the trowels will be retained to inactive condition and thus not be injured by scraping along the walls of the pipe. Also the distributor head control circuits are preferably so interconnected with the tractor control circuits that the distributor head will not operate unless the tractor is moving at the proper slow speed and in the proper direction, thus insuring that the distributor head will not operate when the equipment is being driven at higher speed to the desired position for starting the lining operations or when the equipment is moving at either speed in the wrong direction for lining purposes. Also preferably the controls for driving the equipment at the fast speed are so related to the trowel controls that when the latter are in active position, the equipment cannot be moved at the fast speed, but only at the desired proper slow speed for lining operations. The remote controls are so arranged that in both starting and stopping the actual lining operations, the different elements of the equipment will be operated in the proper order to prevent injury thereto and to prevent distribution of lining material in an improper manner in the pipe.

Further and more specific objects, features and advantages of the invention will appear from the following detailed description taken in connection with the appended drawings which form a part of this specification and illustrate by way of example a preferred form of the invention.

In the drawings:

Fig. 5 is a vertical sectional view taken substantially along line 5—5 of Fig. 3a;

Figs. 6 and 7 respectively are vertical sectional views taken substantially along line 6—6 of Fig. 3 and line 7—7 of Fig. 3a;

Figure 1:
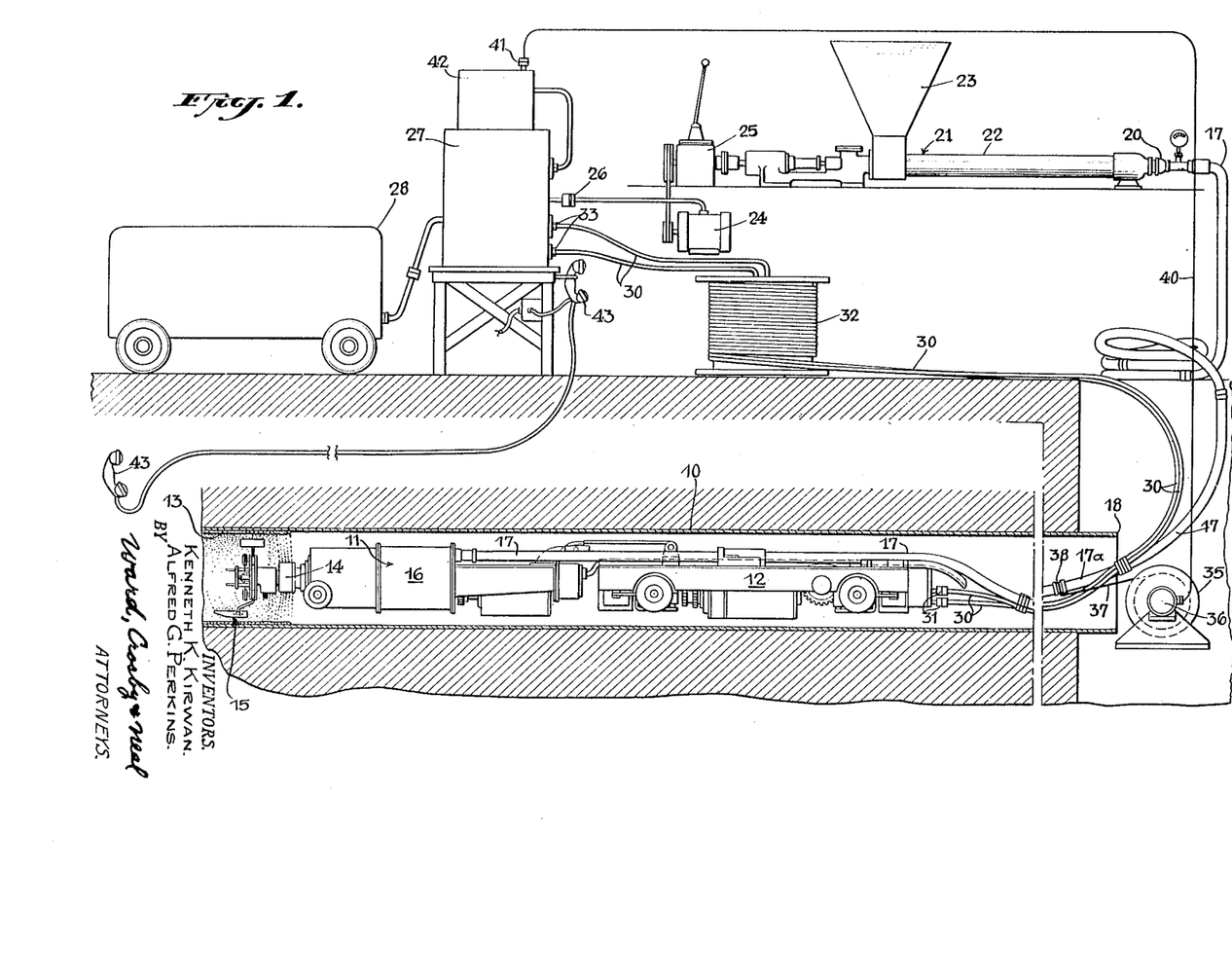
Fig. 1 is a schematic diagram showing the lining equipment in operating position in a pipeline and also showing the associated control equipment located above ground and connected therewith.

Referring now to Fig. 1 in further detail, the pipeline which is to be lined with cement or other suitable material is shown at 10 in its installed position, that is, underground or in some cases possibly partly under water. The lining machine and the tractor means therefor respectively are indicated generally at 11 and 12. A partially completed lining of cement mortar is indicated at 13, the mortar being thrown centrifugally from a rotatable distributor head 14 onto the interior surface of the pipe where it is thereafter trowelled by rotatable trowelling means indicated generally at 15. The lining machine has a mortar receiving hopper portion 16 to which is detachably connected a mortar supply hose 17 which is supported along the top of the tractor means 12 and extends as at 17a out through what will be termed the "near end" 18 of the pipeline. This near end of the pipeline is ordinarily a location where digging has been done to expose a portion of the pipe and a sufficient length of the pipe has been cut out and removed to permit the lining machine and its tractor to be introduced into the pipe. This will ordinarily be the end of the pipe which is to be lined last. That is, the lining equipment as shown in Fig. 1, after being introduced through end 18 is run toward the left either to the "far end" of the pipe or to a point quite distant from the end 18 and at which the lining operation starts.

As indicated, the mortar hose 17 extends up above ground to a coil of extra lengths thereof, thence to the outlet end 20 of a mortar pump 21. This pump may comprise a cylinder 22 for containing a suitable impelling means for forcing the mortar from a hopper 23 into the supply hose. The pump may be rotated by a motor 24 connected by a belt drive to suitable variable transmission gearing at 25 which in turn is connected to the pump shaft. The gearing at 25 may for example be of a type commonly used for automotive transmission purposes. The motor 24 may be connected to a source of power through a quickly detachable plug 26 located on or adjacent a control cabinet 27, which in turn may receive its power from a portable generator 28.

Control cables as at 30 are connected to the forward end of the tractor 12 by detachable plug means 31. These cables with some slack may be temporarily secured as by friction tape to the hose 17 at a point several feet in advance of the tractor and at various other points, for example, on the hose couplings so that these cables will lie closely alongside the hose back at least to the outlet end 18 of the pipe, the cables thence running to a suitable reel 32 and from the reel to detachable plug connections 33 on the control cabinet 27.

A winch 35 driven by motor 36 is positioned adjacent the pipe end 18 or preferably at the ground level nearby, such winch being connected to wind up a wire rope 37 which extends alongside the hose, the wire rope being looped and clipped to a hose coupling, for example at a point normally some fifty feet from the tractor as indicated at 38. Electrical connections as at 40 extend from the winch motor 36 back to a detachable plug connection 41 at a winch control panel 42 located adjacent the control cabinet 27. Interconnected telephones as at 43 may be provided respectively, one adjacent the control cabinet and the other at the far end of the pipe where an observer may be located.

Figures 2, 2A:
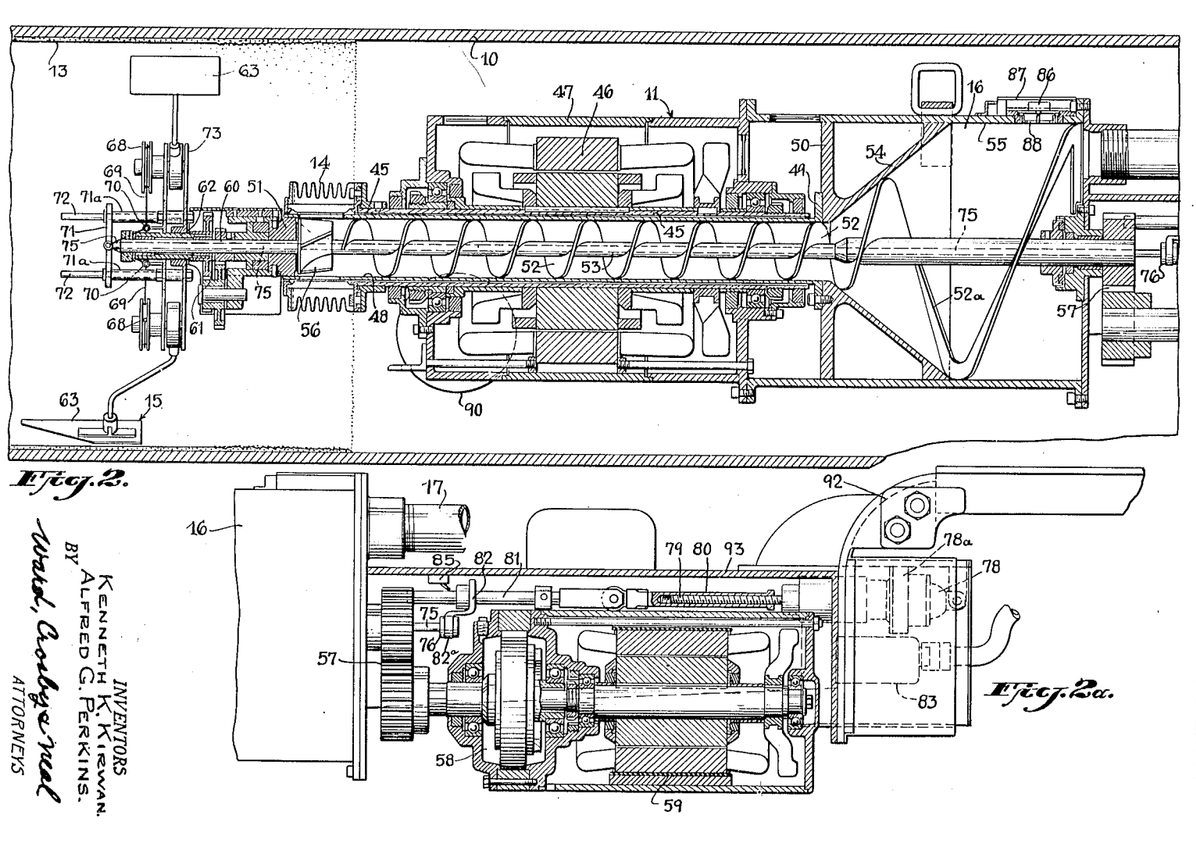
Fig. 2, and Fig. 2a which forms a continuation of the right hand end of Fig. 2, show in further detail and in vertical section, a preferred form of pipe lining machine embodying various features of the invention.

Referring now in further detail to the lining machine as shown in Figs. 2 and 2a, the distributor head 14 as shown may for example be of the type disclosed in the above-mentioned Perkins patent and is secured to a rotatable hollow shaft 45 which constitutes the shaft of the distributor drive motor 46. The housing 47 of this motor may be secured to the rear end of the reservoir chamber 16 in concentric relation thereto. A fixed hollow shaft 48 is located inside the motor shaft 45 and has one end secured as at 49 with respect to an end wall 50 of the chamber 16. The other end of this fixed shaft is secured to bearing means as at 51 for the parts to the rear of the distributor head. A feed screw 52 integrally formed with a rotatable hollow shaft 53 is contained within the fixed hollow shaft 48. The inside walls of the mortar reservoir 16 at the rear portion thereof are of conical shape as indicated at 54, whereas the forward portions are cylindrical as at 55. Feed screw portions as at 52a are shaped as shown to correspond to the shape of the interior walls of the chamber 16 and serve to scrape the mortar therefrom and to force same rearwardly along within the fixed hollow shaft 48 to an agitator 56 fixed upon the feed screw shaft to rotate therewith. This agitator may be similar to the one shown in U. S. patent to Perkins No. 2,287,448. The feed screw shaft is driven at its forward end by gears as at 57, which in turn are connected through a suitable speed reducer 58 to a motor 59.

Figure 4:
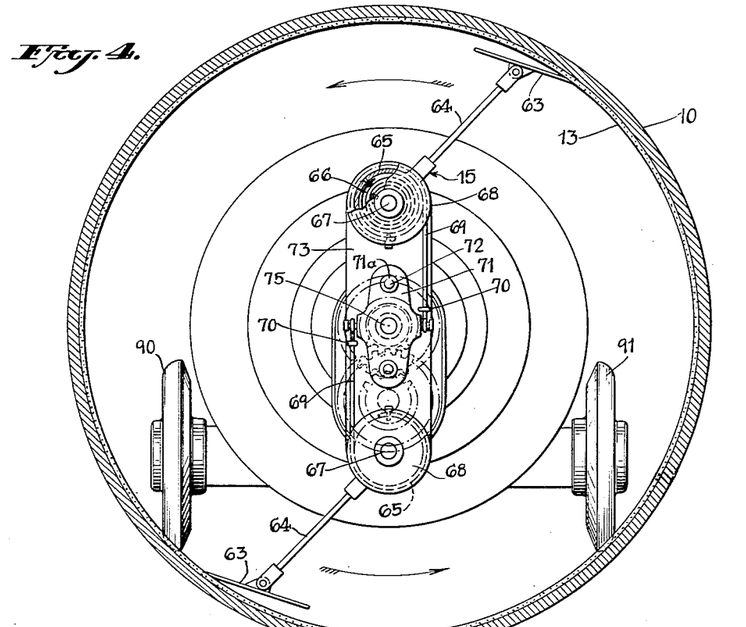
Fig. 4 is an elevational view of the rear end of the lining machine.

The rear end of the feed screw shaft as at 60 is connected through speed reducing gearing as at 61 to drive a hollow shaft 62 which carries the rotatable trowelling means 15. The trowelling means may comprise for example a pair of trowels as at 63 (Figs. 2 and 4) each pivotally connected to arms 64 carried on hub portions 65 which contain spiral springs 66 connected normally to rotate the trowel arms about shafts 67 in a direction tending to thrust the trowels outwardly and to hold them in active engagement with the mortar 13. Each of the shafts 67 carries a pulley 68 about which strands of wire rope 69 are partially wrapped and fixed at one end. As shown in Figs. 2 and 4, these strands pass through suitable eyelet members as at 70 and thence run to connections on a plate member 71. This plate member has hollow tubes 71a fixed thereto and which are slidable on rods 72 which in turn are fixed to the rotatable trowel supporting structure 73. The mid-portion of the plate-like member 71 is fixed with respect to the rear end of a slidable trowel control rod 75, such rod extending forwardly through the feed screw shaft and terminating at 76 just outside the forward end of the mortar reservoir. Thus upon sliding the rod 75 rearwardly by suitable means hereinafter described and connected to its forward end, its rear end serves to slide the plate 71, which in turn pulls upon the strands 69 causing rotation of the pulleys 68 in a direction to oppose the force of the spiral springs 66 and thus to retract the trowels from active trowelling position.

This slidable movement of rod 75 is remotely controlled by an actuator motor 78 and accompanying reduction gearing 78a (see right hand end of Fig. 2a). The shaft of this motor has a threaded extension 79 received within an internally threaded member 80, which in turn is connected to a slidable non-rotatable rod 81 having a finger member 82 fixed thereon. This member has a forked portion 82a within which the end of the shaft 75 is rotatably received, the shaft end being provided with a suitable annularly recessed portion so that as the motor 78 rotates, the threaded connections at 79, 80 cause the shaft 81 to slide in one direction or the other, depending upon the direction of the rotation of the motor and with the consequence that the finger means 82, 82a slides the shaft 75 to control the trowels. Motor 78 may be provided with a suitable well-known type of limit switch control means contained in a box 83 and connections hereinafter described extend from this control means out to the main control cabinet, the connections being such as to permit operation of motor 78 in either direction and for a sufficient number of turns under the control of the limit switches to cause movement of the trowels either to active or inactive position.

Normally the distributor head motor 46 should be of a type adapted to rotate the distributor head for example at a speed of about 1200 revolutions per minute. The feed screw 52 and the agitator 56 on the other hand must rotate at a much slower speed and the trowels at a still slower speed, for example 20 revolutions per minute, which is one reason for providing a separate motor 59 and accompanying suitable reduction gearing for operating the latter parts. Also, if desired the connections for these motors may be such that when starting the machine, the distributor head motor may first be brought up to proper operating speed before the feed screw motor starts and causes the supplying of mortar to the distributor head, and also if desired when the machine is to be stopped, the feed screw motor may be stopped to discontinue the supply of mortar to the distributor head while the latter is still running.

A normally open control switch, for example of the so-called microswitch type, is provided at 85 (Fig. 2a) in a position to be operated by the member 82 to close a circuit whenever the trowels are retracted. The circuit of this switch will be explained further hereinafter in connection with the wiring diagram of Fig. 8, but it may be here mentioned that one of the purposes is to maintain open the circuit which prevents the fast movement of the tractor when the trowels are extended.

On the upper side of the mortar reservoir 16 a control switch 86, which may also be of the so-called microswitch type (Fig. 2) is provided in a suitable housing 87 and connected to be operated by a small disc or rubber diaphragm 88 which closes an aperture in the top wall of the reservoir. As hereinafter further explained, the purpose of this switch and its control diaphragm is to open a circuit whenever the reservoir becomes filled with mortar, such circuit acting automatically to stop the mortar pump and keep it stopped until a short predetermined time, for example 20 seconds, after the pressure of the mortar in the reservoir 16 has been reduced enough to allow the rubber diaphragm to again close the switch 86 and restart the pump.

The lining machine preferably has a three point support comprising two wheels as at 90, 91 (Fig. 4) located approximately at the rear of the motor housing 47. The third support comprising a bracket means 92 is secured to the forward end of a housing 93 (which contains the motor 59 among other parts) secured to the forward end of the reservoir chamber 16 (Fig. 2a). The forward end of the bracket 92 (Fig. 3) is pivotally connected as at 94 to the frame of the tractor means 12.

Figure 3:
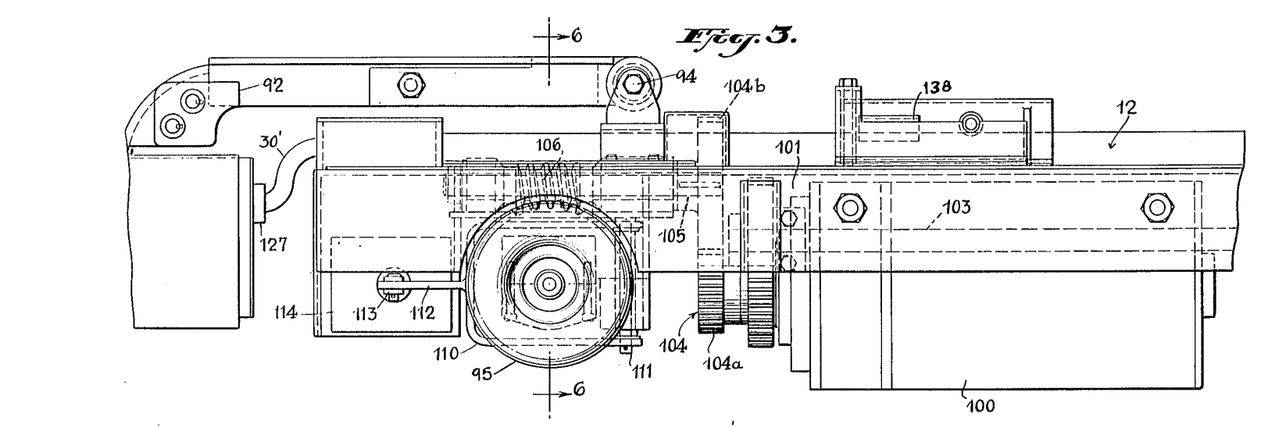
Fig. 3, and Fig. 3a which is a continuation of the right hand end of Fig. 3, are elevational views of a preferred form of tractor for moving the lining machine along within the pipeline.
Figure 3A:
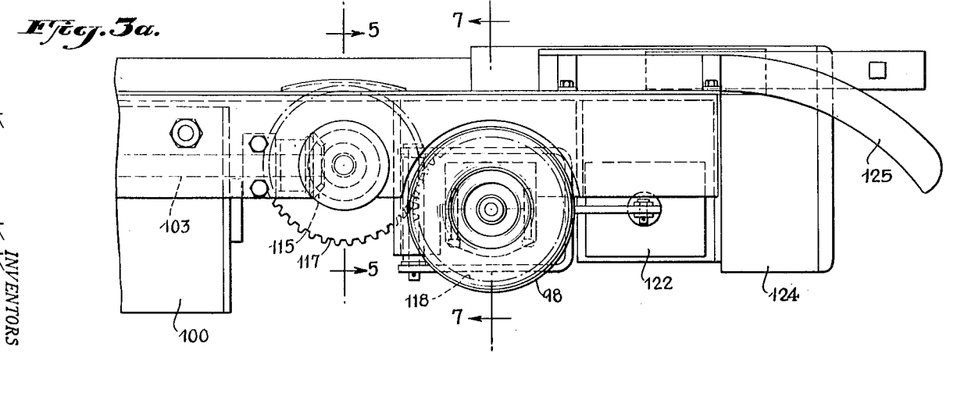
Figure 6:
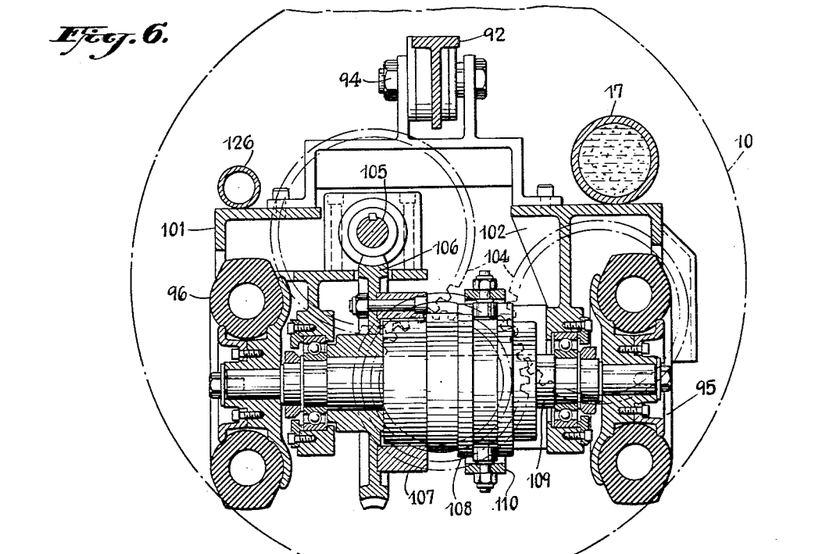
Figure 7:
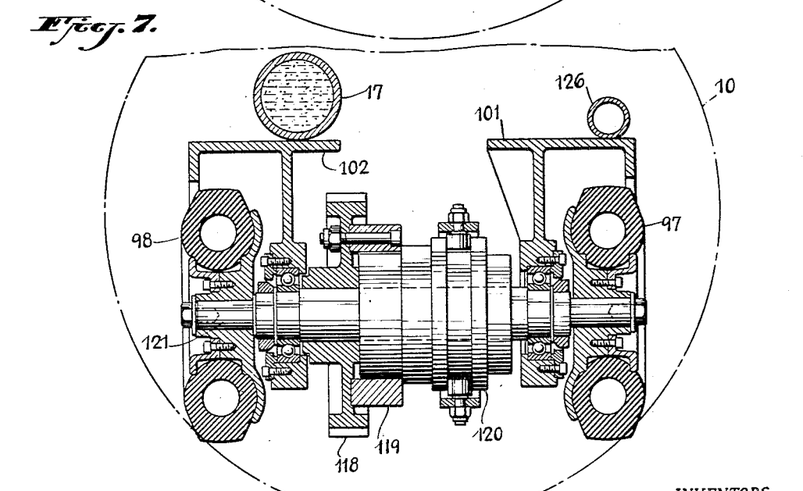

The tractor in turn is supported by a rear pair of wheels 95, 96 (Figs. 3 and 6) and a forward pair of wheels 97, 98 (Figs. 3a and 7). All of the supporting wheels preferably have rubber tires. Since the lining machine per se has a three point support and has an articulated connection with the tractor means by reason of the bracket 92 and its pivotal connection 94, the whole equipment, although relatively long as compared with the diameter of the pipe, is able to follow relatively sharp curves in the pipe during its travel without becoming jammed against the pipe walls.

Referring now to further details of the construction of the tractor means in connection with Figs. 3 and 5 to 7 inclusive, a suitable reversible drive motor 100 is suspended from the tractor frame parts 101, 102. Through suitable gearing 104, this motor drives shafts 103 and 105. The latter shaft in turn drives through worm gears 106, a clutch member 107 which cooperates with another clutch member at 108, so that when the clutch is engaged, an axle or shaft 109 will be driven to thus drive tractor wheels 95 and 96, mounted on the latter shaft (see Fig. 6). Clutch member 108 may be operated by a forked member 110, the prongs of the fork being pivotally mounted on a pin 111 (Fig. 3) and the base of the fork having an extension 112 pivotally connected as at 113 to a solenoid contained in a housing 114.

The speed of the motor and the arrangement of gearing connecting same to drive the wheels 95, 96 is preferably such that when the above mentioned clutch is connected, the tractor means as a whole will travel at a relativey slow speed, such as ordinarily required when the lining machine is operating to apply mortar, for example from about 2 to 8½ feet per minute. Such speed may, of course, be varied by adjustment of the control circuits for the motor or if preferred by utilizing interchangeable gears at 104a and 104b.

The forward end of motor driven shaft 103, as indicated in Fig. 3a, is arranged to drive, through beveled gearing 115, a shaft 116 (Fig. 5) which in turn, through gears 117, 118, drives a clutch member 119 cooperating with another clutch member 120, through which the axle or shaft 121 for wheels 97, 98 is driven (Fig. 7). The clutch 119, 120 may be operated in the same way as the above-described clutch 107, 108, by means of a solenoid contained in housing 122 (Fig. 3a). The gearing from the motor to the shaft 121 for the forward wheels is such that these wheels during operation of the motor at normal speed will serve to drive the tractor as a whole considerably faster than when the driving power is applied through the rear wheels, for example at about 137 feet per minute. Thus the drive by means of the forward wheels is well adapted for causing the tractor to move rapidly to the location where lining work is to begin, or in some cases from where lining operations are stopped to an outlet end of the pipe.

Figure 5:
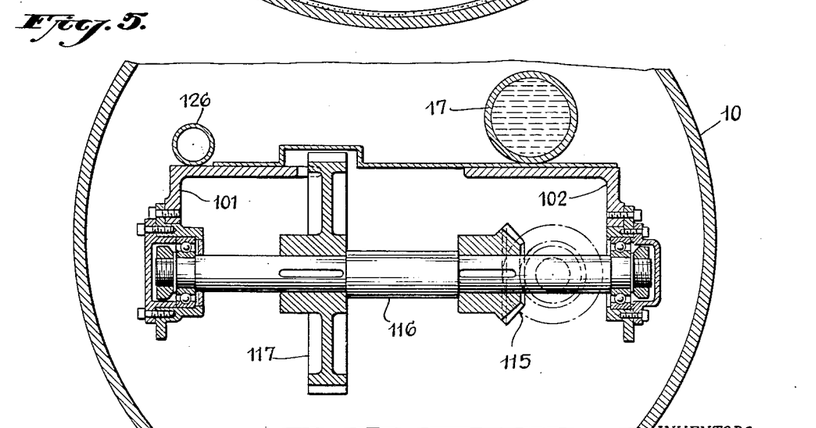

As hereinafter explained in connection with the wiring diagram, flexible connections for the control of the motor 100 and the solenoids 114a, 122a extend along as a part of the cable means 30 to the exterior of the pipe and into the control cabinet 27. A control box for motors 46 and 59 may be located at 124 at the forward end of the tractor. The position at which the mortar hose 17 may be carried along the top of the tractor means is indicated in Figs. 5-7 and at the very forward end of the tractor, a forwardly and downwardly curved cradle or support 125 is provided for the hose. The position at which the control cable or cables for the lining machine may be carried along the top of the tractor means is indicated by the conduit 126 in Figs. 5-7. At the rear end of the tractor means (Fig. 3), the control wires or cable 30' for the lining machine may have a quickly detachable plug connection as indicated at 127.

The upper part of the diagram of Fig. 8 indicates the portions of the control circuits which are located above ground or outside the pipe, these portions being connected by a multiconductor cable or cables to the equipment below ground, viz. the lining machine and tractor. Starting at the upper left hand corner of the diagram, the portable alternating current generator is indicated at 28 connected through a main switch 128 to the various circuits which are equipped with fuses as at 129. (For clearness in Fig. 8 the various detachable plugs, connection blocks etc. are omitted.)

Each of the principal control circuits also is accompanied by a pilot light, these being designated on the diagram by the letters A to Q inclusive. In general the various double-pole double-throw switches shown afford connections for pilot lights which will indicate whether each important element of the equipment is operating or is disconnected.

The mortar pump motor is indicated at 24, accompanied by a starter 24a and a double-pole double-throw switch 24b which when thrown to its upward position puts the pump motor under manual control, and when thrown to its downward position puts the pump under the control of a timer 130 which, in a manner hereinafter described, controls a switch 131, the timer in turn being under the control of the switch 86 in the lining machine, the latter being the pressure operated switch on the mortar reservoir as above referred to. The operation of the switch 86 in connection with the timer will be hereinafter explained as a part of the description of the operation of the entire equipment.

A voltmeter 132 serves to indicate when the reservoir pressure switch 86 is in its normal closed position.

Figures 8, 8A:
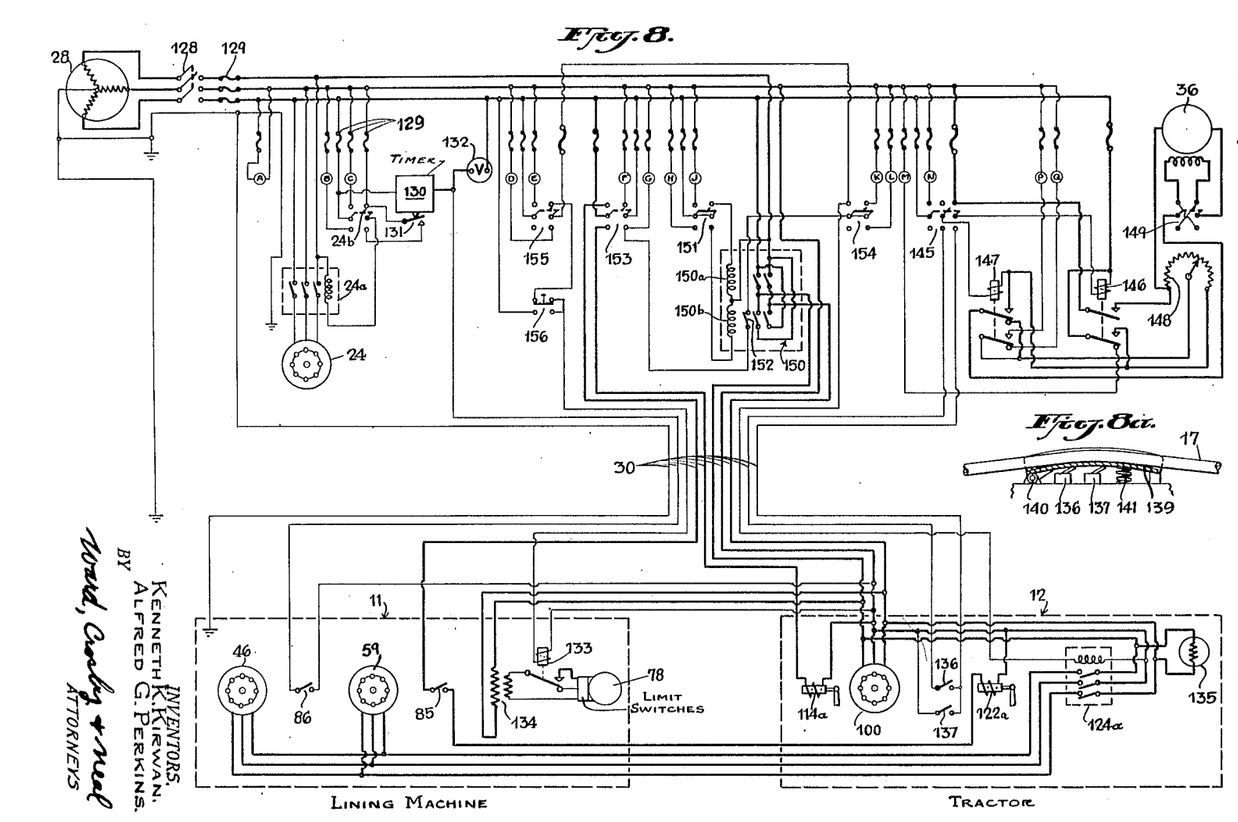
Fig. 8 is a diagram of the control circuits.
Fig. 8a is a somewhat diagrammatic view of certain switch details.

As indicated in Fig. 8, the circuit elements on the lining machine, in addition to the switch 86, include the distributor drive motor 46, the screw drive motor 59, the trowel control motor 78 accompanied by its limit switches and by a control relay 133 and also a transformer 134 for furnishing low voltage power to this motor circuit. Also as hereinabove mentioned there is a switch 85 on the lining machine under the control of the trowel-adjusting mechanism and acting to open a circuit for preventing fast movement of the tractor when the trowels are extended in active position.

The following electrical elements are mounted on the tractor, viz.: slow and fast speed clutch control solenoids 114a and 122a mounted in the housings 114 and 122 hereinabove mentioned in connection with Figs. 3 and 3a; the tractor drive or travel motor 100; a motor starter 124a contained in the casing 124 above mentioned in connection with Fig. 3 (this motor starter being for the distributor and screw drive motors 46 and 59); and, if desired, a headlight 135 may be mounted on the front end of the tractor. The tractor also carries a pair of microswitches 136, 137 as indicated in the wiring diagram, these being mounted on suitable bracket means as at 138 on the top of the tractor (Fig. 3). Fig. 8a shows somewhat schematically the way in which these two switches are actuated. That is, at a point adjacent the switches the hose 17 passes along in a curved guide or cradle 139 which is pivoted at 140 and is normally thrust by a spring 141 outwardly from the switches 136, 137. When the mortar hose is quite slack, the guide or cradle 139 is free to be thrust counterclockwise by the spring 141 and in that condition the switches 136, 137 are normally closed. However, when the winch has subjected the hose to a medium amount of tension, the guide or cradle will be thrust somewhat clockwise about its pivot 140 causing switch 136 to open, and if the hose tension is increased still further, switch 137 will also open. Switches 136, 137 are connected through a triple-pole double-throw switch 145 to two relays 146, 147, the contacts of which control the winch motor 36 to drive same either at full speed or at a slow speed through a potentiometer type of rheostat 148 which is manually adjustable. Motor 36 is also accompanied by a reversing switch 149.

The drive motor 100 for the tractor is controlled through a reversing motor starter 150 located in the main control box above ground. It will be noted that the power supply wires to the motor 100 have branches running to the motor starter 124a for the distributor head and screw drive motors on the lining machine so that the latter two motors can only be started after the motor starter for the tractor drive motor has been actuated.

Starter 150 includes solenoids 150a, 150b respectively for starting the motor in a direction to drive the tractor inwardly toward the far end of the pipe or outwardly toward the near end of the pipe (when lining operations are going on). The solenoids 150a and 150b are under the control of a double-pole travel control switch 151 which when thrown to its upper position causes the tractor to travel inwardly of the pipe, and when in its lowermost position, causes the tractor to advance outwardly toward the near end of the pipe. The reversing motor starter assembly also includes a switch 152 adapted to be closed when the adjacent solenoid 150b is energized to thereby close a circuit running from one of the contacts of a double-pole double-throw solenoid control switch 153 to one of the contacts on another double-pole double-throw switch 154 which controls actual starting and stopping of the lining operations.

Another double-pole double-throw switch is provided at 155 for controlling the position of the trowels. A push button 156 is used as hereinafter explained in adjusting and testing the positioning of the trowels.

The various successive steps in operating the entire equipment will now be explained.

After excavations down to the pipe have been made at two widely spaced points respectively located at the near and far ends of the pipe section to be lined, pieces of pipe, each for example about five feet long are then removed at the points of excavation and the section of pipe which is to be lined is then cleaned free of water and debris by any suitable method. Next the lining machine, followed by the tractor, are inserted in the near end of the pipe and the various electrical connections thereto are plugged in. The mortar hose 17 is connected to the lining machine in the manner indicated in Fig. 1. Winch control switch 145 is thrown to its upper position for manually controlling the winch motor 36 through relay 146. As will be apparent from examination of the circuits under the control of this relay, it will serve to provide connections through the potentiometer 148 such as to drive the winch motor 36 slowly depending upon the manual adjustment of potentiometer 148, in a direction depending upon the position of the reversing switch 149. At this time the latter switch is thrown in a direction to cause the winch motor 36 to unwind the steel cable 37 which is connected to the winch, thus giving this cable sufficient slack to permit it to be clamped as at 38 to the mortar hose (Fig. 1). Also sufficient slack may be imparted to the steel cable to permit it to be clipped or clamped to the hose 17 at another point, say about 50′ in back of the point 38. The electrical cable or cables 30 are now fastened to the mortar hose with friction tape as hereinabove described at spaced points, the electrical cable being tied to the hose at successive couplings with enough slack to allow for stretching of the hose when under pressure.

The equipment is now ready to be operated to cause the tractor to drive the lining machine toward the far end of the pipe where lining operations are to start. To do this, solenoid control switch 153 is thrown to its upper or "fast" position. This does not cause the tractor to start, however, because the power supply to the tractor motor has not yet been connected. To connect such power supply, the travel control switch 151 is thrown to its upper or "in" position, thus energizing solenoid 150a of the reversing motor starter 150. This starts the tractor motor 100. Also, this will connect power to the "fast speed" solenoid 122a, thus operating the fast speed clutch for the tractor so that the lining machine will now be caused to travel into the pipe at fast speed (for example about 137 feet per minute) and the mortar hose and electrical cable or cables will be trailed after the tractor. The machine is stopped at the desired position where lining operations are to start in the pipe, by opening travel control switch 151.

If the point where lining operations in the pipe are to be started is quite remote from the near end, the above operations may be repeated and followed each time by connecting in added lengths of electrical cable and hose.

When the machine is at the position where lining operations are to start, the trowels will normally be accessible at the far end of the pipe for adjustment and testing. To accomplish this, push button 156 is pressed and held down. Then the travel control switch 151 is thrown to either active position, whereupon the tractor motor 100 will start and also current will be applied to the transformer 134 on the lining machine, which supplies low voltage power to the relay circuit for the trowel control motor 78. However, at this time the machine does not move, even though tractor motor 100 is operating, because the solenoid control switch 153 is now open so that the tractor clutches remain disconnected. Push button 156 now furnishes power to energize the magnet of relay 133 on the lining machine so that the contact of this relay will be moved to its "up" position and trowel control motor 78 will start under power from the transformer 134, this motor now turning in a direction to cause the trowels to be released to their operative trowelling positions. Then the push button may be released and the travel control switch 151 moved to open position, leaving the trowels extended. Pressure of the trowels against the pipe wall may then be tested by manual manipulation and such pressure may be adjusted as necessary. Upon completion of the trowel adjustment, they may be retracted by throwing travel control switch 151 in either direction without touching push button 156. This will have the effect of providing power to transformer 134 and thence to the circuit controlled by relay 133, the relay contact now being in its "down" position, causing the trowel control motor 78 to operate in the direction to retract the trowels. As hereinabove mentioned, the motor 78 is accompanied by limit switches of a conventional type, which cut off the current to the motor as soon as it has operated long enough in either direction to actuate the trowels.

Since the mortar hopper in the lining machine is empty at the start, the hopper pressure control switch 86 will be in its normal closed position. It will be noted that the circuit of this switch is such that it will then apply power to the timer 130. This timer may be of any suitable known type containing a motor which, when energized, will by cam operation act to close the switch 131 thereby applying power to the lower right hand contact of the pump control switch 24b. Thus as soon as the latter switch is thrown to its lower or automatic position, the pump motor 24 will start. Cement mortar is placed in the pump hopper 23 and as soon as the pump motor is thus started, the mortar will be forced through the hose 17 into the lining machine hopper. The hose will stretch somewhat as pressure is applied and therefore will become slack. To take up this slack by the winch, the winch control switch 145 is thrown to its "down" or "automatic" position.

At this point the automatic control of the winch motor under various conditions of slack in the hose 17 will be explained. Assuming that the lining machine is advancing or is ready to advance toward the near end of the pipe and that the hose is quite slack, then under these conditions both of the switches 136 and 137 will be closed. By following the connections from these switches and assuming that winch control switch 145 is in its down position, it will be noted that both relays 146 and 147 will then be energized. Assuming then that the reversing switch 149 for the winch motor 36 is in the position for causing this motor to operate the winch to wind up the steel cable 37, then the relay contacts with both relays 146 and 147 energized will be such that the motor will be driven at its fastest speed for rapidly pulling on the hose. (The connection to the center tap of potentiometer 148 will be disconnected and full potential will be applied to motor 36.) As soon as the hose then becomes subjected to a medium amount of tension, switch 136 will open, and it will be noted that this in turn will deenergize relay 147 while leaving the winch motor still under the control of relay 146 which remains energized. The contacts and connections to the latter relay are such, as will be noted, as to connect the winch motor through the center tap of the potentiometer 148 and thus the motor will be operated at a relatively slower speed depending on the manual adjustment of said center tap. This adjustment may be made by trial to normally cause the winch motor to pull out on the hose at a speed approximating the speed of the lining machine and tractor during lining operations. If, however, the winch speed as so adjusted is a little too slow so that the hose becomes quite slack, then switch 136 will close again and cause the winch motor to operate at full speed as above described. On the other hand if the winch speed becomes a little too fast so that the hose becomes strongly tensioned, then switch 137 as well as switch 136 will open, causing both relays 146 and 147 to be deenergized thereby stopping the winch motor while the lining machine and tractor continue to advance until enough slack is again accumulated in the hose to cause the winch to again be started at slow speed in the manner above described. And if still more slack occurs, the winch motor will be operated again at full speed since then both switches 136 and 137 will be opened.

Reverting now to the operation of the mortar pump as controlled by the timer 130. When the mortar hopper on the lining machine becomes filled, the internal pressure of the mortar opens pressure switch 86, which disconnects the power from the timer 130, and the timer is so constructed as to then open switch 131, thereby deenergizing the coil of starter 24a and stopping the mortar pump motor 24.

The equipment is now ready to start actual lining operations in the pipe. To do this, the travel switch 151 is thrown to its down position lighting pilot light H, and this starts the tractor motor 100 in its forward direction and also causes auxiliary switch 152 in the reversing motor starter 150 to be closed. Solenoid control switch 153 is now thrown to its down position, lighting pilot light G and energizing the slow speed solenoid 114a, thus throwing in the "slow" clutch which starts the machine traveling at lining speed of say 2 to 4 feet per minute toward the near opening of the pipe. Also, closing of the switch 153 applies power through auxiliary contact 152 of the reversing starter to the center of the lining control switch 154, lighting pilot lamp K. Switch 154 is now thrown to its upper position thereby actuating the starter 124a on the tractor, which in turn starts the distributor motor 46 and the screw motor 59 on the lining machine. Mortar will now be forced out from the distributor head on the lining machine and thrown on the pipe walls as the machine travels forward. Then the trowel control switch 155 is thrown to its upper position thereby energizing the magnet of relay 133 on the lining machine whereby the contact of this relay is moved to its upper position causing trowel control motor 78 to operate to release the trowels into operating position against the pipe walls. The machine will now be lining normally.

As soon as the mortar hopper on the lining machine starts to empty, the pressure on switch 86 is relieved, thus closing this switch and starting timer 130 and energizing voltmeter 132. The timer is arranged so that after it has operated for about 12 seconds, for example, it will act to close the switch 131 and start the mortar pump motor 24, which will continue in operation until the lining machine hopper is again filled, causing opening of pressure switch 86 to stop the pump. The timer acts to delay for a short interval the restarting of the pump upon each closing of the switch 86, thereby preventing the pump motor and its starter from being rapidly turned on and off and consequently injured due to any rapid off and on movements of the switch 86.

If it is desired to retract the trowels during the lining operation, for example to prevent them from scraping off the lining mortar at a bend in the pipe, then trowel control switch 155 is thrown, thereby causing the trowels to be retracted. By again closing switch 155 in its upper position, the trowels can be restored to active position without stopping the lining operation. If it is desired to omit the lining at some point in the pipe, adjacent a valve for example, this can be done by throwing off the lining control switch 154 for the desired interval. It will be apparent that the circuits are such that this will stop the motors 46 and 59, thus stopping the application of mortar and at the same time power will be maintained on transformer 134, but relay 133 will be released, thus causing the trowel motor 78 to start so that the trowels will be automatically retracted, although the machine will continue to travel at its normal lining speed.

When the machine comes near to the end of the desired run, the pump switch is thrown off so that the machine will use up the mortar in its hopper and reduce the pressure in the mortar hose to facilitate disconnection. When the machine is substantially at the end of the section to be lined, the trowel control switch 155 is thrown to its down position and after allowing the trowels to retract, then travel control switch 151 and solenoid control switch 153 are opened to stop the machine, which may now be disconnected and removed from the pipe for cleaning. By throwing the mortar pump control switch 24b to the upper position and by running water into the hopper 23, the pump may be used to force clean water into the hose 17 for cleaning same.

It will be noted that the switch 85 on the lining machine which is opened whenever the trowels are extended, will serve to open the circuit of the fast solenoid 122a, thereby preventing the machine from being moved at fast speed in either direction with the trowels extended, inasmuch as the fast speed clutch will be disconnected. It will be further noted that the head and screw motors 46 and 59 can be operated only when the lining machine is traveling toward the near end of the pipe at slow speed, since the lining control switch 154 can furnish power to the coil of starter 124a only through auxiliary switch 152 on the tractor motor starter 150 at a time when motor 100 is operating in the forward direction and when the solenoid control switch 153 is energizing the slow speed solenoid 114a.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. In apparatus for lining underground pipe by means controlled externally of the pipe, the combination comprising a wheel mounted machine adapted to travel along within the pipe and having an electric motor-driven rotatable dispenser for distributing lining material onto the interior of the pipe, motor-driven rotatable trowelling means following said dispenser, electrically operated means at said machine for controlling movement of said trowelling means to and from active and inactive positions while the dispenser is rotating, control circuit connections adapted to extend to the exterior of the pipe for controlling said electrically operated means, other circuit connections also adapted to extend to the exterior of the pipe for controlling the electric motor drive for the dispenser, the latter circuit connections being interconnected with said first named connections to actuate said electrically operated means to retract the trowels to inactive position when power to the dispenser motor is disconnected.

2. In apparatus for lining underground pipe, the combination comprising a machine adapted to travel along within the pipe and to distribute lining material onto the interor thereof, motor-driven rotatable and retractable trowelling means on said machine, trowel retracting means, electric motor drive apparatus for advancing the machine at two different speeds and in either direction, and a switch in a circuit controlling the fast drive of said apparatus, said retracting means being arranged to actuate said switch to render the fast drive inoperative except when said trowel retracting means is maintaining the trowels retracted.

3. In apparatus for lining underground pipe, the combination comprising a machine adapted to travel along within the pipe and to distribute lining material onto the interior thereof, said machine including a mortar reservoir and a hose connection adapted to extend therefrom to the exterior of the pipe, electric motor-driven mortar pumping means connected to the external end of said hose, a pressure responsive diaphragm on said reservoir, a switch actuatable by said diaphragm in response to the quantity of mortar in the reservoir and having connections adapted to extend to the exterior of the pipe, said switch and connections acting to control the pump motor to stop and restart same responsive to the quantity of mortar in said reservoir and its pressure against said diaphragm.

4. In apparatus for lining underground pipe, the combination comprising a machine adapted to travel along within the pipe and to distribute lining material onto the interior thereof, said machine including a mortar reservoir and a hose connection adapted to extend therefrom to the exterior of the pipe, electric motor-driven mortar pumping means connected to the external end of said hose, switch means at said reservoir actuatable in response to filling of the reservoir to a predetermined degree, said switch means having connections adapted to extend to the exterior of the pipe and acting to control the pump motor to stop same responsive to such filling, and a timer associated with said connections for automatically starting the pump motor at a predetermined time after said switch means has responded to the receding of the level of the mortar in said reservoir.

5. In apparatus adapted for lining underground pipe, the combination comprising a machine adapted to travel along within the pipe and having a rotatable motor-driven dispensing head for distributing lining material onto the interior of the pipe, a reservoir on said machine in advance of said dispensing head and connected to said head by a conduit coaxial with the dispensing head and its drive motor, a feed screw for forcing lining material from said reservoir through said conduit to said dispensing head, a drive motor and accompanying reduction gearing mounted in advance of said reservoir and connected to drive said feed screw, rotatable trowelling means to the rear of said dispensing head, spring means for normally urging said trowelling means into active position, reduction gearing mounted adjacent the rear end of said feed screw and driven thereby and acting to rotate said trowelling means, a trowel retracting motor and accompanying limit control switches mounted in advance of said reservoir and mechanical connections therefrom running coaxially of the feed screw back to the trowelling means, and electrical connections for all of said motors adapted to extend to the exterior of the pipe.

6. The combination comprising: a pipe lining machine adapted to travel through pipe and having a motor driven dispenser for distributing lining material onto the interior of the pipe; motor drive apparatus for advancing the machine through the pipe in a predetermined direction; a control circuit for the motor drive extending to the exterior of the pipe; a control circuit for the dispenser; and interconnections between said circuits for disconnecting power from the dispenser except when the motor drive is connected to drive the machine in said predetermined direction.

7. The combination comprising: a pipe lining machine adapted to travel through pipe and having an electrically driven rotary dispenser for distributing lining material onto the interior of the pipe; trowelling means rotatably mounted on the machine; spring means for normally urging the trowelling means to active position; mechanism for rotating the trowelling means at a speed substantially slower than the speed of rotation of the dispenser; electrically controlled mechanism for retracting such trowelling means from active position; a circuit for said dispenser including control apparatus therefor at the exterior of the pipe; and electrical connections extending to the exterior of the pipe for controlling said retracting mechanism, said connections also being under the control of said apparatus and acting to cause retraction of the trowelling means when power is disconnected from the dispensing means.

8. The combination comprising: a pipe lining machine adapted to travel through pipe and having an electrically driven dispenser for distributing lining material onto the interior of the pipe; electric motor drive means for advancing the machine through the pipe independently of the dispenser drive; trowelling means on the machine; electrically controlled mechanism for retracting such trowelling means from active position; and control circuits extending to the exterior of the pipe for the dispenser drive, for the machine motor drive and for said retracting means, said control circuits including switches for retracting the trowelling means independently of the stopping of the machine drive and dispenser drive, and also for retracting the trowelling means responsive to stopping of the dispenser drive while the machine drive continues in operation.

9. The combination comprising: an electrically driven machine adapted to move along within pipe and to distribute lining material onto the interior thereof, said machine having a hopper for receiving a body of the material; a hose adapted to extend from said hopper to a source of supply of said material at the exterior of the pipe; a motor-driven winch adapted to pull said hose outwardly of the pipe in advance of the lining machine during the lining operation; a plurality of switches mounted in a position to be actuated responsive to varying tensions in the hose; and relay apparatus controlling the winch motor circuit responsive to actuation of said switches to increase or decrease the winch motor speed respectively when the hose is slack or subjected to heavy tension.

10. The combination comprising: a pipe lining machine adapted to travel through pipe and having an electrically driven dispenser for distributing lining material onto the interior of the pipe; reversible electric motor drive means for advancing the machine through the pipe independently of the dispenser drive; electrically controlled clutch and gear means for connecting the machine motor drive to drive the machine alternatively at a speed for lining operations and at a higher speed; and control circuits extending to the exterior of the pipe for the dispenser drive, for the machine motor drive and for said clutch means, said control circuits including interconnected switches for connecting power to the dispenser drive only in response to the connection of power to drive the machine motor drive in one direction and while the slow speed clutch means is in operation.

11. The combination comprising: a pipe lining machine adapted to travel through pipe and having an electrically driven dispenser for distributing lining material onto the interior of the pipe; electric motor drive means for advancing the machine through the pipe independently of the dispenser drive; electrically controlled means for connecting the machine motor drive to drive the machine alternatively at a speed for lining operations and at a higher speed; and control circuits extending to the exterior of the pipe for the dispenser drive, for the machine motor drive and for said electrically controlled means, said control circuits including interconnected switches for connecting power to the dispenser drive only in response to the connection of power to drive the machine motor drive in one direction and while the slow speed control means is in operation.

12. The combination comprising: an electrically driven machine adapted to move along within pipe and to distribute lining material onto the interior thereof, said machine having a hopper for receiving a body of the material; a hose adapted to extend from said hopper to a source of supply of said material at the exterior of the pipe; a motor-driven winch adapted to pull said hose outwardly of the pipe in advance of the lining machine during the lining operation; a pair of switches mounted in a position to be actuated responsive to varying tensions in the hose; a pair of relays under the control of said switches and acting to control the winch motor circuit to stop said motor when the hose is subjected to heavy tension and to increase or decrease the winch motor speed respectively when the hose is slack or subject to tension.

13. The combination comprising: a pipe lining machine adapted to travel through pipe and having a motor-driven dispenser for distributing lining material onto the interior of the pipe; electric motor drive apparatus for advancing the machine through the pipe either in one direction while not operating to line the pipe or in the other direction while operating to line the pipe; a control circuit for the motor drive extending to the exterior of the pipe; a control circuit for the dispenser; and interconnections between said circuits for disconnecting power from the dispenser except when the motor drive is connected to drive the machine in said other direction.

14. The combination comprising: a pipe lining machine adapted to travel through pipe and having a motor-driven dispenser for distributing lining material onto the interior of the pipe; electric motor drive apparatus for advancing the machine either at a fast speed into the pipe in one direction or a slow speed in the other direction; control circuits for such motor drive apparatus extending to the exterior of the pipe; a control circuit for the dispenser motor; and interconnections between said circuits for disconnecting power from the dispenser except when the motor drive is connected to drive the machine at such slow speed and in said other direction.

15. The combination comprising: a pipe lining machine adapted to travel through pipe and having a motor-driven dispenser for distributing lining material onto the interior of the pipe; a reversible electric motor-driven wheel mounted tractor for advancing the machine into the pipe and in the reverse direction out of the pipe during the lining operation; electro-magnetically controlled mechanism on said tractor for connecting its motor to drive the tractor at either a slow speed or a faster speed; electrical circuits extending to the exterior of the pipe for controlling said mechanism for reversing the tractor motor and for controlling the dispenser motor; and interconnections between said circuits for disconnecting power from the dispenser except when the tractor motor is connected to drive the machine at the slow speed and in said reverse direction.

16. In remotely controllable apparatus adapted for lining underground pipe of restricted size, the combination comprising a machine adapted to travel along within the pipe and having a rotatable motor-driven dispensing head for distributing lining material onto the interior of the pipe, a reservoir on said machine in advance of said dispensing head and connected to said head by a conduit coaxial with the dispensing head and its drive motor, a feed screw for forcing lining material from said reservoir through said conduit to said dispensing head, a drive motor and accompanying reduction gearing mounted in advance of said reservoir and connected to drive said feed screw, rotatable trowelling means to the rear of said dispensing head, reduction gearing mounted adjacent the rear end of said feed screw and driven thereby and acting to rotate said trowelling means, a trowel retracting motor mounted in advance of said reservoir and mechanical connections therefrom running coaxially of the feed screw back to the trowelling means, and electrical connections for all of said motors extending forwardly of the apparatus to the exterior of the pipe.

17. The combination comprising: an electrically driven machine adapted to move along within pipe and to distribute lining material onto the interior thereof, said machine having a hopper for receiving a body of the material; a hose adapted to extend from said hopper to a source of supply of said material at the exterior of the pipe; a motor-driven pump for pumping said material from said source of supply through the hose to said hopper; electrical control means at said hopper acting in response to the level of the material in the latter and having a circuit extending to said motor-driven pump to stop and start the latter respectively when the hopper is filled and when the level of the material becomes substantially lower; a motor-driven winch for pulling said hose outwardly of the pipe during the lining operation; and electrical control means for said winch responsive to varying tensions in the hose to increase or decrease the winch motor speed respectively when the hose is slack or subjected to heavy tension.

18. The combination comprising: a pipe lining machine adapted to travel through pipe and having a motor-driven dispenser for distributing lining material onto the interior of the pipe; a reversible electric motor-driven wheel mounted tractor for advancing the machine into the pipe and in the reverse direction out of the pipe during the lining operation; electromagnetically controlled mechanism on said tractor for connecting its motor to drive the tractor at either a slow speed or a faster speed; and electrical circuits extending to the exterior of the pipe for controlling said mechanism, for reversing the tractor motor and for controlling the dispenser motor.

19. The combination comprising: a pipe lining machine adapted to travel through pipe and having an electrically driven dispenser for distributing lining material onto the interior of the pipe; electric motor drive means for advancing the machine through the pipe independently of the dispenser drive; trowelling means on the machine; electrically controlled mechanism for retracting such trowelling means from active position; and control circuits extending to the exterior of the pipe for the dispenser drive, for the machine motor drive and for said retracting means, said circuits including switch means for retracting the trowelling means independently of the stopping of the machine drive and dispenser drive.

20. The combination comprising: a pipe lining machine adapted to travel through pipe and having an electrically driven dispenser for distributing lining material onto the interior of the pipe; reversible electric motor drive means for advancing the machine through the pipe independently of the dispenser drive; electrically controlled clutch and gear means for connecting the machine motor drive to drive the machine alternatively at a speed for lining operations and at a higher speed; rotatable trowelling means on said machine; control circuits extending to the exterior of the pipe for the dispenser drive, for the machine motor drive and for said clutch means; and electrically operated means at said machine with control means extending to the exterior of the pipe for controlling movement of said trowelling means to and from active and inactive positions while the dispenser is rotating.

21. The combination comprising: a pipe lining machine adapted to travel through pipe and having an electrically driven dispenser for distributing lining material onto the interior of the pipe; electric motor drive means for advancing the machine through the pipe independently of the dispenser drive; electrically controlled means for connecting the machine motor drive to drive the machine alternatively at a speed for lining operations and at a higher speed; and control circuits extending to the exterior of the pipe for said electrically controlled means, said control circuits including interconnected switches for connecting power to the dispenser drive only in response to the connection of power to drive the machine motor drive in one direction.

22. The combination comprising: a pipe lining machine adapted to travel through pipe and having an electrically driven dispenser for distributing lining material onto the interior of the pipe; electric motor drive means for advancing the machine through the pipe independently of the dispenser drive; electrically controlled means for connecting the machine motor drive to drive the machine alternatively at a speed for lining operations and at a higher speed; and control circuits extending to the exterior of the pipe for the dispenser drive, for the machine motor drive and for said electrically controlled means, said control circuits including interconnected switches for connecting power to the dispenser drive only while the slow speed control means is in operation.

References Cited in the file of this patent

UNITED STATES PATENTS

| | | |
|---|---|---|
| 1,018,253 | McWilliams et al. | Feb. 20, 1912 |
| 1,185,842 | Sessions | June 6, 1916 |
| 1,308,850 | Larsh | July 8, 1919 |
| 1,799,559 | Hunicke | Apr. 7, 1931 |
| 2,095,888 | Perkins | Oct. 12, 1937 |
| 2,105,091 | MacKay | Jan. 11, 1938 |
| 2,185,570 | Ridley | Jan. 2, 1940 |
| 2,297,163 | Perkins | Sept. 29, 1942 |
| 2,305,154 | Gilbert | Dec. 15, 1942 |
| 2,355,342 | Van Wormer | Aug. 8, 1944 |
| 2,399,321 | Butler | Apr. 30, 1946 |
| 2,481,009 | Gill | Sept. 6, 1949 |
| 2,484,018 | Crom | Oct. 11, 1949 |
| 2,508,154 | Frisch | May 16, 1950 |
| 2,575,353 | MacEvoy | Nov. 20, 1951 |